Inventor:
Josef Beier

April 7, 1959  J. BEIER  2,880,624
FRICTION DRIVE
Filed Nov. 30, 1954  8 Sheets-Sheet 3

Inventor:
Josef Beier

April 7, 1959 J. BEIER 2,880,624
FRICTION DRIVE
Filed Nov. 30, 1954 8 Sheets-Sheet 4

Inventor:
Josef Beier
BY:
Michael S. Striker
agt

April 7, 1959 J. BEIER 2,880,624
FRICTION DRIVE
Filed Nov. 30, 1954 8 Sheets-Sheet 6
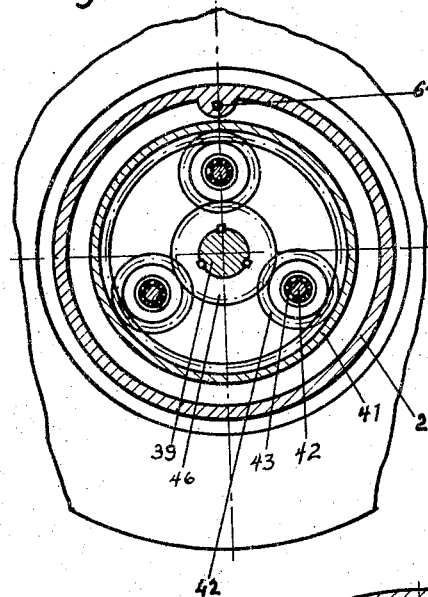
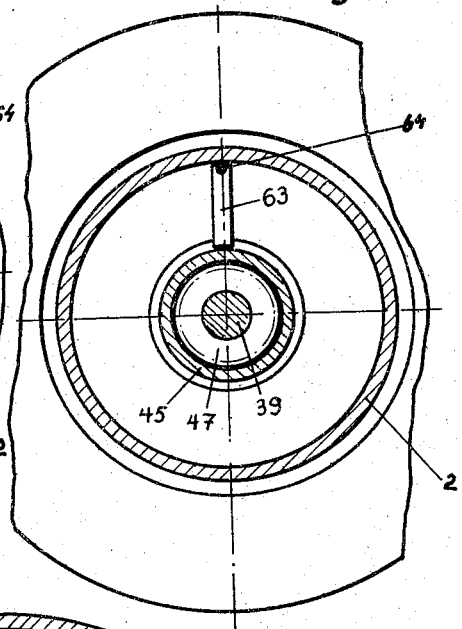
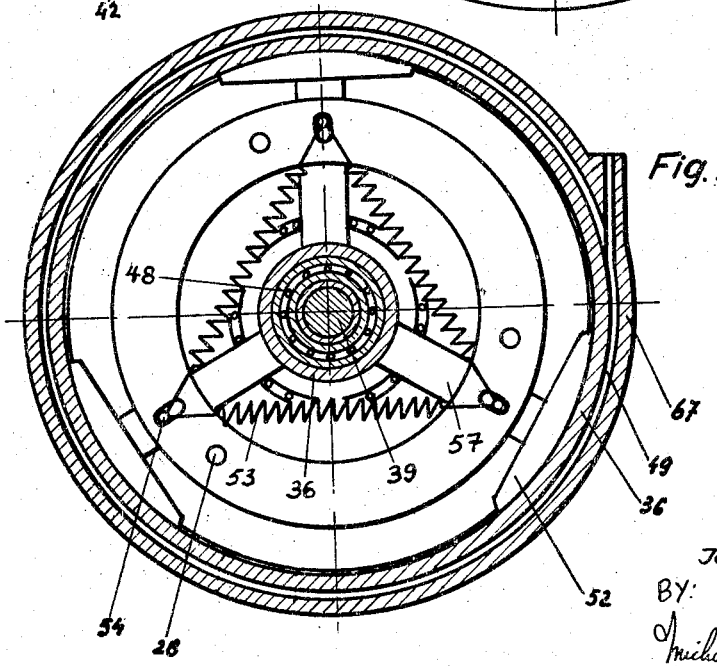
Inventor:
Josef Beier
BY:
Michael S. Striker
agt.

Inventor:
Josef Beier

April 7, 1959  J. BEIER  2,880,624
FRICTION DRIVE

Filed Nov. 30, 1954  8 Sheets-Sheet 8

Inventor:
Josef Beier
BY:

United States Patent Office 2,880,624
Patented Apr. 7, 1959

2,880,624

FRICTION DRIVE

Josef Beier, Sarnen, Switzerland; Alice Beier, nee Siegenheim, Karlsruhe, Germany, Hans Herbert Beier, East-Boldon, England, and Regine Beier, Karlsruhe, Germany, heirs of the estate of said Josef Beier, deceased Application November 30, 1954, Serial No. 472,142

Claims priority, application Germany December 28, 1953

18 Claims. (Cl. 74—199)

The present invention relates to friction drives, and more particularly to variable friction drives of the type in which groups of friction discs having conical side faces are in frictional engagement with groups of friction discs having peripheral friction rims.

The variable friction drives according to the prior art are only suitable for transmitting small loads. Greater loads require a greater number of friction discs so that in the prior art the diameter of the shaft supporting the friction discs has to be increased in accordance with the greater stress. In friction drives of the type in which the ratio of transmission is varied by inserting the friction discs of one group to various degrees between the friction discs of another group, the increase of the shaft diameter reduces the available radial extension of the respective friction discs so that the drive cannot be varied within a sufficiently wide range.

Another difficulty which arises when a great number of conical friction discs cooperates with friction discs having peripheral rims resides in that the conical friction discs, when moving to a position in which they deeper project between the friction discs having peripheral rims, urge the latter friction discs apart in axial direction. Since each friction disc is moved to a certain extent, a great number of friction discs results in an axial expansion of a group of friction discs which is too large if a great number of friction discs forms one group. When the ratio of the friction transmission is suddenly changed, for instance, when the conical friction discs are rapidly shifted from a position deeply projecting between the friction rim discs to a position in which the thinner peripheral edge of the conical friction discs is operative, the cooperating friction rim discs may be blocked, due to the oblique position assumed by the friction discs, particularly by the outwardly located friction discs.

It is one object of the present invention to overcome the disadvantages of the friction drives according to the prior art, and to provide a friction drive capable of transmitting great loads.

It is another object of the present invention to provide a variable friction drive in which the friction discs can be easily shifted in axial direction.

It is a further object of the present invention to provide a friction drive in which the friction discs are arranged in groups, and are pressed together by means independently cooperating with each group of friction discs.

It is a still further object of the present invention to provide annular body means on the shaft, and to mount groups of annular friction wheel means on the annular body means.

It is yet an object of the present invention to provide a plurality of annular body means on a shaft each annular body means supporting spaced groups of annular friction wheel means.

It is also an object of the present invention to mount groups of friction disc means on movable supports and to vary the ratio of transmission by shifting the movable supports by centrifugal means.

It is another object of the present invention to press groups of cooperating friction disc means together with a force corresponding to the torque transmitted by the friction discs.

It is a further object of the present invention to provide means for reversing the direction of rotation of the friction drive.

With these objects in view the present invention mainly consists in a friction drive which comprises, in combination, shaft means having an axis of rotation; at least one annular body means mounted on the shaft means; means connecting the annular body means to the shaft means for rotation therewith; two groups of annular friction wheel means non-rotatably mounted on the annular body means; supporting means; at least two shafts mounted on the supporting means and having axes of rotation parallel to the axis of rotation of said shaft means; and at least two groups of friction disc means mounted on each of the shafts and being in frictional meshing engagement with the two groups of friction wheel means.

The present invention also consists in a friction drive comprising, in combination, shaft means having an axis of rotation; at least one annular body means mounted on the shaft means, the annular body means having an outwardly projecting annular portion and two annular outer surfaces, one outer annular surface on each side of the annular projecting portion; two groups of annular friction wheel means, each group of annular friction wheel means being mounted on one of the annular surfaces non-rotatable and slidable in axial direction; supporting means; at least two shafts mounted on the supporting means and having axes of rotation parallel to the axis of rotation of said shaft means; two groups of friction disc means mounted on each of the shafts non-rotatable and slidable in axial direction, and being in frictional engagement with the two groups of friction wheel means; a pair of pressure members, each of the pressure members being mounted at one end of the annular body means non-rotatable and movable in axial direction, each of the pressure members cooperating with one of the groups of annular friction wheel means and the group of friction disc means meshing with the same and pressing associated groups of friction wheel means and friction disc means against the annular projecting portion of the annular body means when moving toward the same; and means for urging the pressure members in axial direction toward the annular projecting portion.

According to a preferred embodiment of the present invention, wedge means respectively connected to a shaft means and to the pressure members urge the pressure members toward each other with a force depending on the torque exerted by the shaft means.

The friction drive according to the present invention is preferably gradually variable, and the friction disc means are supported on movable supports for changing the effective radius between the friction disc means and the friction wheel means.

The friction disc means preferably have conical side faces engaging friction rims of the friction wheel means. However, it is also contemplated to provide friction wheel means having conical side faces on the annular body means, and friction discs having peripheral rims on the shafts.

According to a modified embodiment of the present invention the shifting of the friction discs to vary the transmission ratio is effected by centrifugal weight means which are counteracted by spring means. In this embodiment it is preferred to provide reversing means for reversing the direction of rotation of the driven shaft means. The reversing means include preferably planetary gear means and means for blocking the planetary gear means whereby a reversal of the direction of rotation of the shaft means is obtained.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 10 is a cross-sectional view taken on line II—II in Fig. 9;

Fig. 11 is a cross-sectional view taken on line III—III in Fig. 9;

Fig. 12 is a cross-sectional view taken on line IV—IV in Fig. 9;

Figure 1:
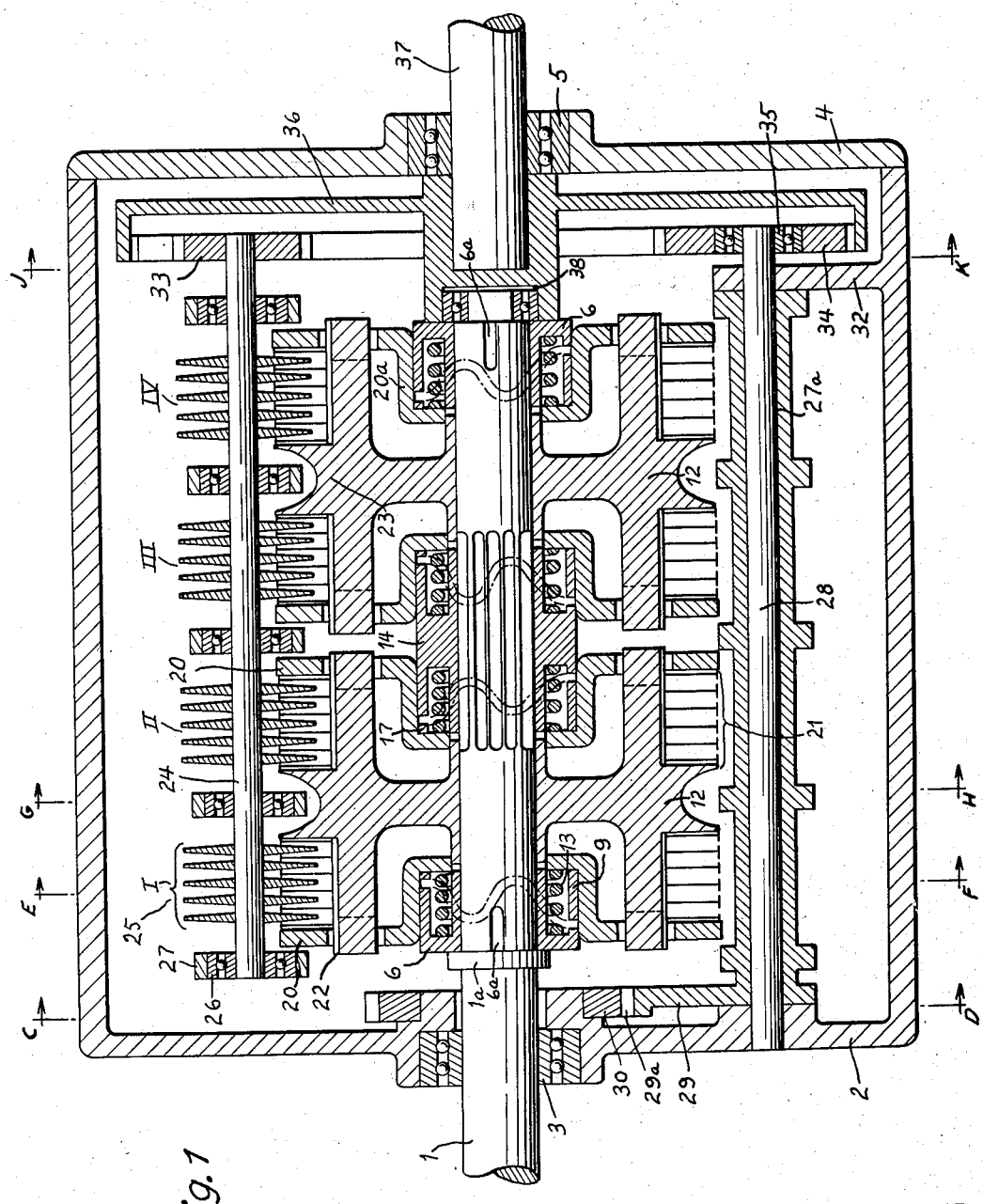
Fig. 1 is an axial sectional view taken on line A—B in Fig. 2.

Referring now to the drawings, and more particularly to Fig. 1 which illustrates one embodiment of the present invention, the shaft 1 is considered to be the drive shaft, and the shaft 37 is considered to be the driven shaft. However, the arrangement may be reversed.

The shaft means 1 is mounted on the casing 2 in a ball-bearing 3 at one end thereof, while the other end of shaft means 1 is turnably mounted in ball-bearing 38 in the hub of an internal gear 36. The shaft 37 is mounted in the casing 2 in ball-bearing 5 so that the shaft means 1 and the shaft 37 are aligned, and have a common axis of rotation.

The casing 2 has a cover 4 and is preferably secured to a motor, or otherwise supported.

Figure 7:
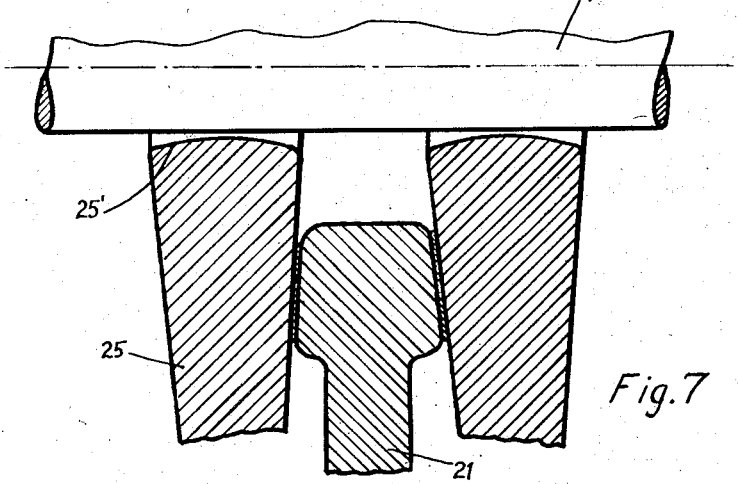
Fig. 7 is a fragmentary axial sectional view illustrating a constructive detail.

Two annular body means 12 are mounted on the shaft 1 turnably and movable in axial direction. The annular body means 12 have outwardly projecting annular portions 23 which are arranged in the plane of symmetry of the respective body means, and annular surfaces on both sides of the annular projections 23. Two groups of annular friction wheel means 21 are arranged on each annular body means 12, one group on each side of the annular projecting portion 23. The friction wheel means 21 are preferably of the type having friction rims as shown in Fig. 7 and are mounted on the outer annular surfaces 22 of the body means 12 non-rotatable, but slidable in axial direction. The annular surfaces 22 of the body means 12 are provided with axial extending ridges cooperating with corresponding cutouts in the annular friction wheel means 21.

Each group of friction wheel means 21 cooperates with a group of friction disc means 25 having conical side faces, as best seen in Fig. 7. The friction discs 25 are arranged in four groups corresponding to the groups of friction wheel means 21 and being mounted on shafts 24 slidable in axial direction, and non-rotatable. The grooved cross-section of shafts 24 can be best seen in Fig. 8, and the central bores in the friction discs 25 are provided with corresponding projections and recesses so that the friction discs 25 are connected for rotation to the shafts 24. As shown in Fig. 7, the central bores of the friction discs 25 have a convex arcuate outline 25' and are mounted on shafts 24 with ample play so that the discs 25 can assume an oblique position with respect to the axis of the shaft 24 on which they are mounted. This arrangement prevents binding during axial sliding, and also permits the outermost discs to assume an oblique position when the friction rims of the friction wheels 21 engage the thin peripheral portions of the friction discs 25 when the distance between the shafts 24 and the shaft means 1 is increased as will be described hereinafter in greater detail.

A pair of pressure members 20 is mounted on each annular body means 12, and is guided on the ridges on the surfaces 22 for axial movement. It will be understood that as each pressure member is moved inwardly, the respective groups of friction wheel means 21 and friction disc means 25 are pressed against the respective annular projecting portion 23 whereby the required frictional engagement between the friction means 21, 25 is obtained.

Figure 6:
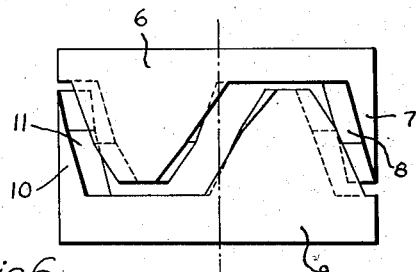
Fig. 6 and Fig. 6a are fragmentary side elevations of details.

Each pressure member 20 has a cup-shaped hub 20a to which is secured a sleeve-shaped wedge means 9 having claws 10 provided with wedge faces 11 as best seen in Fig. 6. The claws 10 of wedge means 9 of the outer pressure members 20 cooperate with claws 7 of sleeve-shaped wedge means 6 fixedly secured to the shaft 1. The key 6a prevents rotation of the wedge means 6. One wedge means 6 abuts against a flange 1a of the shaft 1, and the other wedge means 6 abuts against the hub of the internal gear 36 so that no axial movement of the wedge means 6 in outward direction is possible. Spring means 13 are arranged between the respective sleeve-shaped wedge means 6 and the respective movable sleeve-shaped wedge means 9 and urge the outer pressure members 20 inwardly.

Another sleeve-shaped wedge member 14 is arranged on shaft 1 intermediate the two annular body means 12 and is preferably mounted on shaft 1 non-rotatable but slidable in axial direction for a short distance. Grooves are provided in the corresponding portion of shaft 1 to receive key means for this purpose.

Figure 6A:
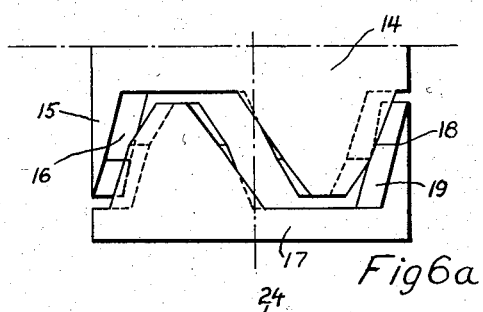

The sleeve-shaped wedge means 14, of which only half is shown in Fig. 6a, is provided with at both ends claws 15 having wedge faces 16 cooperating with corresponding claws 18 having wedge faces 19 and forming part of sleeve-shaped wedge means 17 which are secured to the cup-shaped hubs of the inner pressure members 20. Spring means are provided on both sides of the sleeve-shaped wedge means 14 engaging the same and the corresponding wedge means 17 and the respective hubs of the pressure members 20.

The annular body means 12 are mounted on shaft 1 with sufficient axial play with respect to the movable sleeve-shaped wedge means 9 and 17 so that the pressure produced by the wedge means is evenly distributed through the four groups of cooperating friction discs 25 and friction wheels 21. Such pressure is produced on one hand by the action of the compression springs 13 which continuously urge the movable pressure members 20 toward the annular projecting portions 23 to prevent slipping during idling, and on the other hand by the wedge action of the cooperating claws of the sleeve-shaped wedge means. When the shaft 1 is turned, the wedge means 6 and 14 turn with the same, engage the claws of the wedge means 9 and 17 and urge the same in a wedge action to move in axial direction whereby the pressure members 20 move toward the corresponding projecting portions 23 and press the friction means against each other with a force which depends on the transmitted torque.

In the event that the pressure on the group of friction discs I caused by wedge means 6 is greater than the pressure on the group II produced by one-half of the wedge means 14, the annular body means 12 moves to the right until the equilibrium is again maintained. In the event that the pressure exerted on the groups of friction discs III and IV is lower than the pressure exerted on the groups I and II, not only the body means 12 on the left side of Fig. 1, but also the body means 12 on the right side of Fig. 1, as well as the double wedge means 14 move to the right until all axial pressures are in equilibrium. This is made possible by the axial play of the annular body means 12 and of the double wedge means 14.

Figure 2:
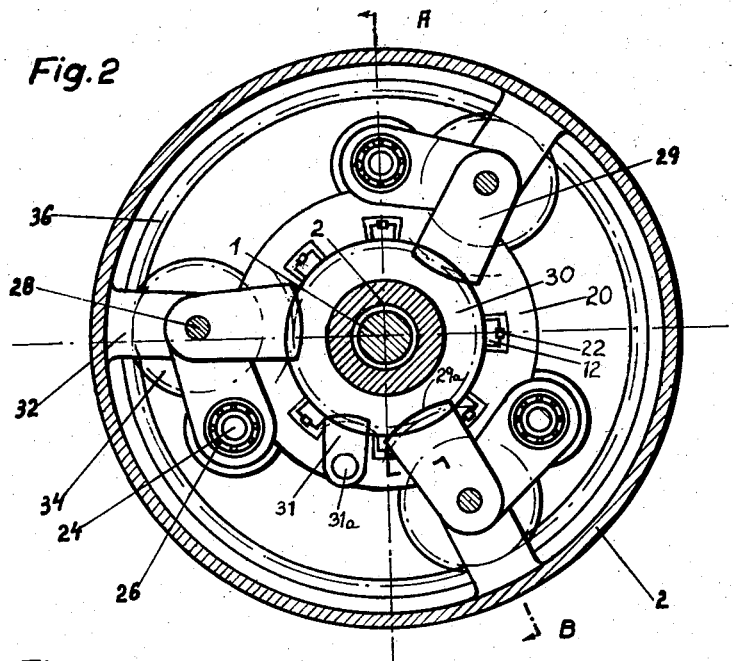
Fig. 2 is a cross-sectional view taken on line C—D in Fig. 1.
Figure 5:
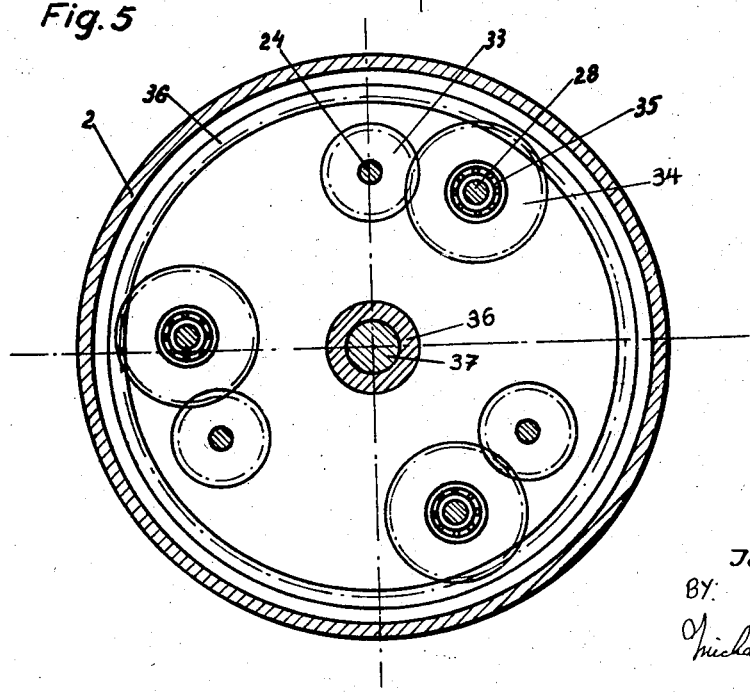
Fig. 5 is a cross-sectional view taken on line J—K in Fig. 1.
Figure 3:
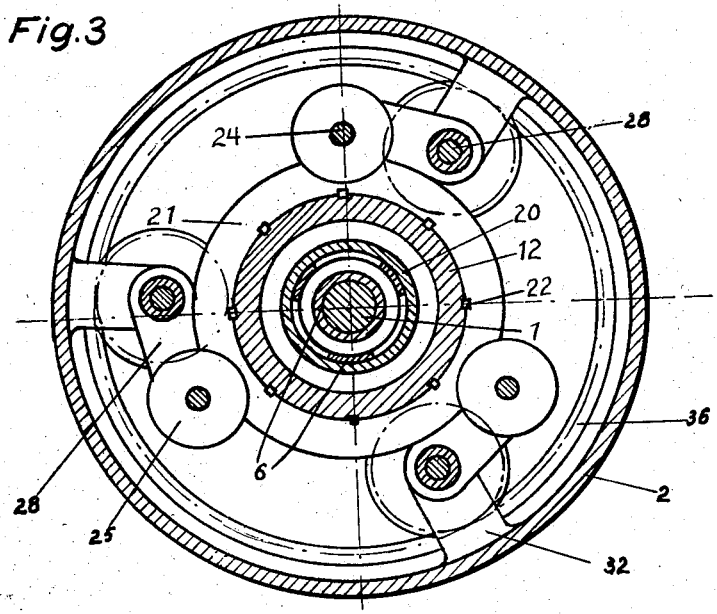
Fig. 3 is a cross-sectional view taken on line E—F in Fig. 1.
Figure 4:
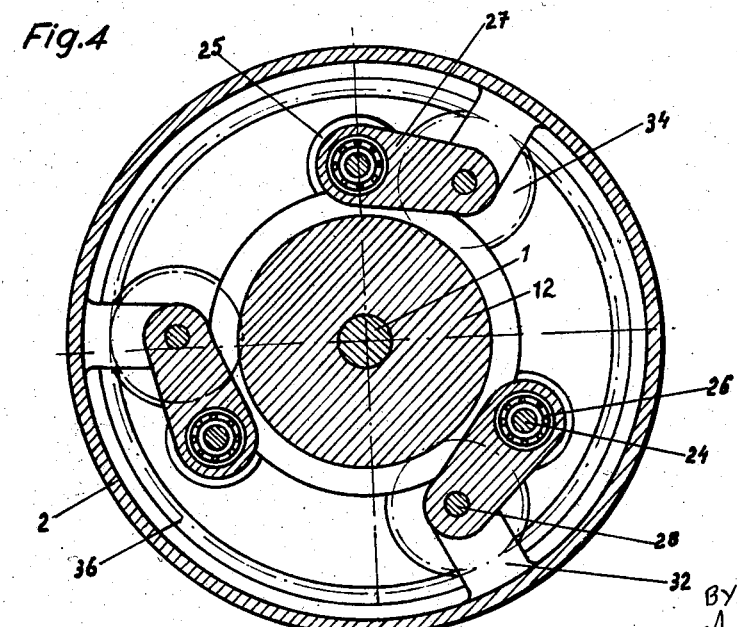
Fig. 4 is a cross-sectional view taken on line G—H in Fig. 1.

The shafts 24 are mounted on movable supporting means including supporting arms 27 pivotally mounted on pins 28 which are mounted in the casing 2 and on the wall portions 32. The shafts 24 are mounted in ball-bearings 26 in the arms 27, the arrangement being such that one arm 27 is arranged between each group of friction disc means 25 so that the long shafts 24 are not subject to bending stresses. The supporting arms 27 are best seen in Figs. 2 and 4. An operating arm 29 is connected to the hub portion 27a of the movable supporting means, and is provided with a toothed segment 29a which meshes with a gear 30 mounted on the casing 2. Gear 30 is engaged by another toothed segment 31 which is operated by a shaft 31a which passes out of the casing 2, see Fig. 2.

When the shaft 31a is turned, the segment 31 turns the gear 30 and thereby the movable supporting means 29, 27a and 27 of the shafts 24 so that the same move in substantially radial direction with respect to the shaft means 1. Such movement will result in a change of the transmission ratio between the friction disc means 25 and the friction wheel means 21, since the effective radius, that is the distance between the friction rim of the friction wheel means 21 and the axis of the respective shaft 24, is varied.

It will be understood that as the friction discs 25 having conical side faces are outwardly moved, the portions engaged by the rims of the friction wheel means 21 are thinner so that the friction discs of the groups 25 and 21 will have to be pushed together which is effected by the movable pressure members 20 in cooperation with the fixed projecting portions 23 of the body means 12. The springs 13 will provide a minimum pressure, but as the torque on shaft 1 increases the wedge means 6, 9, 14 and 17 will become more effective, and the pressure members 20 will be actuated with a force corresponding to the transmitted torque.

The convex arcuate shape of the central bores of the discs 25 facilitates the axial movement of the same, and due to the fact that the annular friction wheel means 21 are also sub-divided into groups, the axial shifting of the friction wheels of each group does not exceed a distance which can be reliably covered by the respective pressure members.

A gear 33 is secured to the end of each shaft 24, preferably at the end remote from the arm 29. The gears 33 mesh with the gears 34 supported on ball bearings 35 on the pins 28. Gears 34 mesh with an internal gear 36. Consequently, the gears 33 and 34 transmit the rotation of the shafts 24 to the internal gear 36 which is connected to the driven shaft 37 for rotation therewith. When the arms 27 are pivoted, the gears 33 roll on the gears 34, so that the shafts 24 are connected to the shaft 37 in any shifted position of the friction disc means 25.

Figure 9:
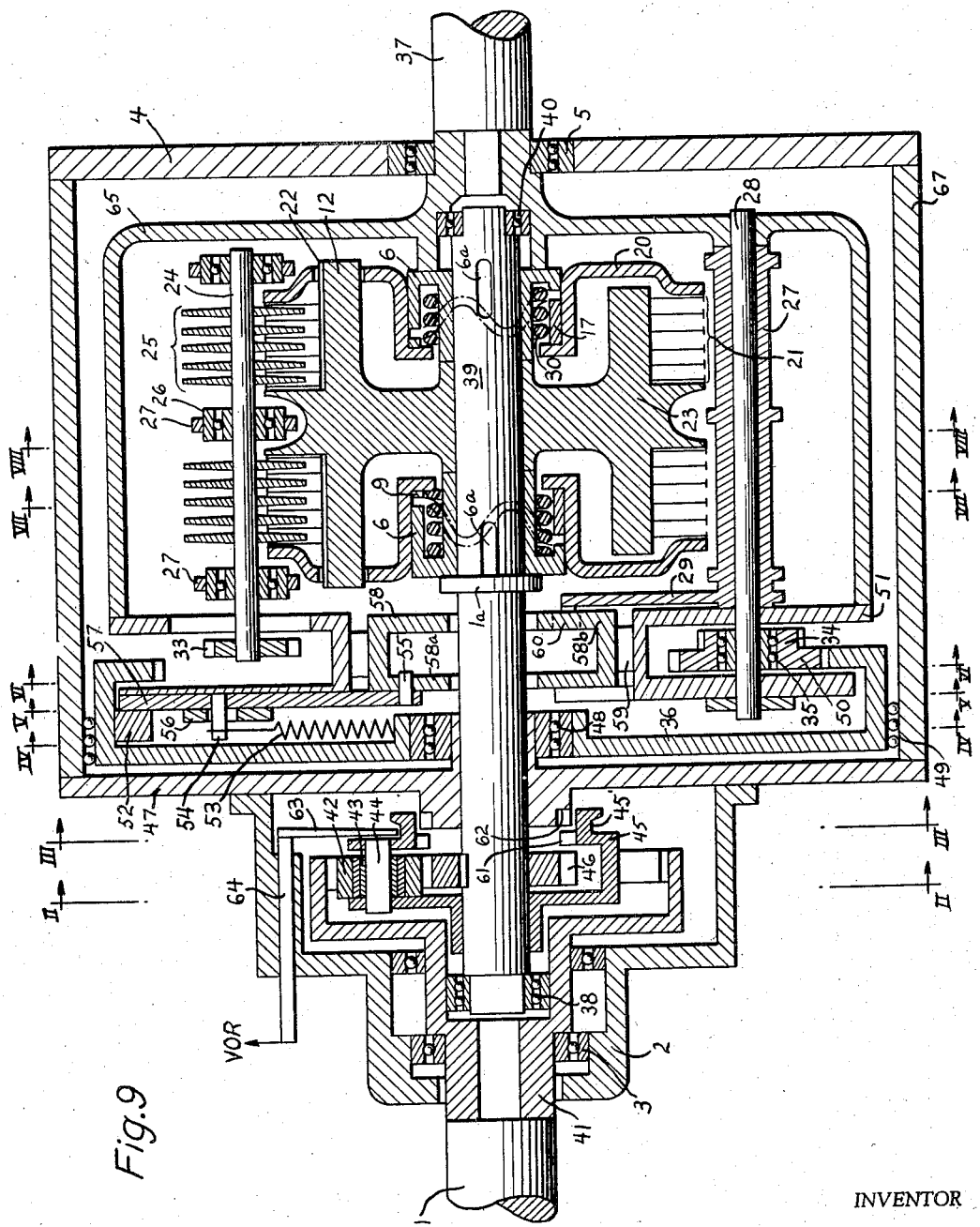
Fig. 9 is an axial sectional view of a modified embodiment of the present invention.
Figure 13:
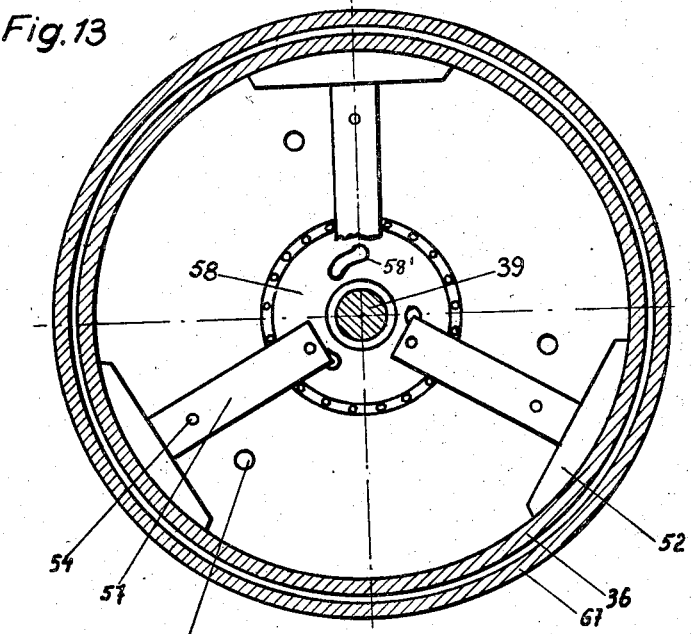
Fig. 13 is a cross-sectional view taken on line V—V in Fig. 9.
Figure 14:
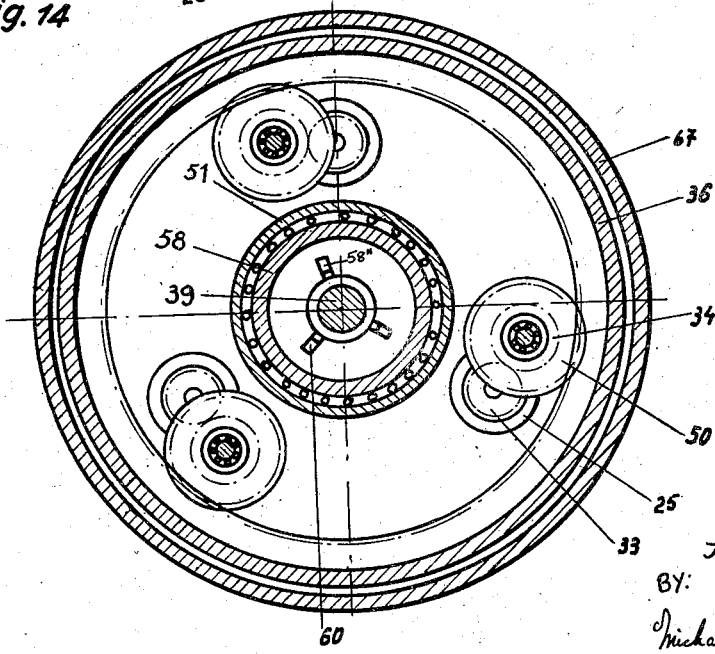
Fig. 14 is a cross-sectional view taken on line VI—VI in Fig. 9.
Figure 15:
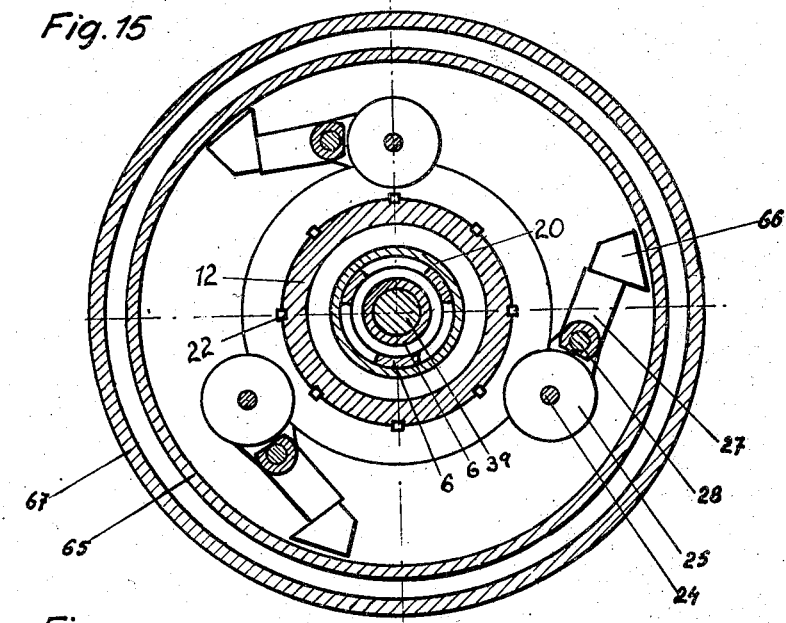
Fig. 15 is a cross-sectional view taken on line VII—VII in Fig. 9.
Figure 16:
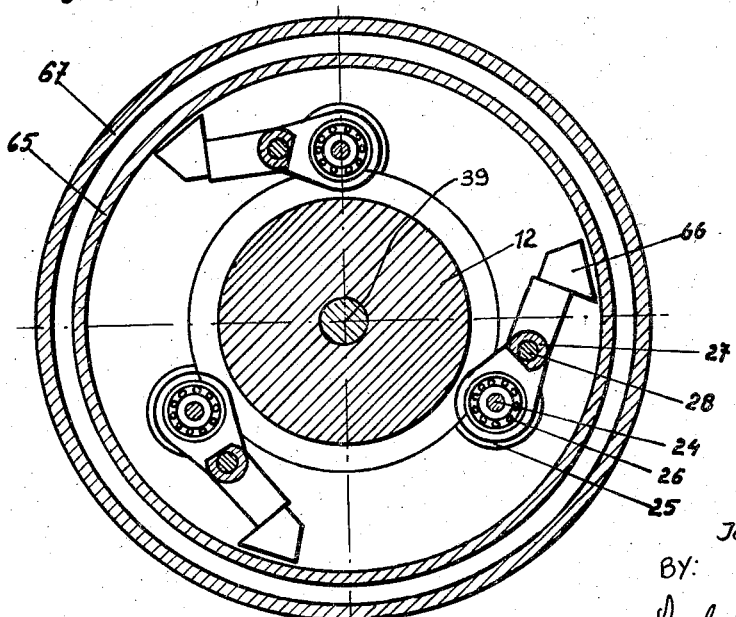
Fig. 16 is a cross-sectional view taken on line VIII—VIII in Fig. 9.

The modified embodiment illustrated in Figs. 9–16 is similar to the embodiment shown in Fig. 1 and is mainly intended for use as an automatic transmission for vehicles. In the embodiment of Fig. 9, reversing means for reversing the direction of rotation are provided.

In the embodiment shown in Figs. 9–16, the shaft 37 is the drive shaft and turns a drum-shaped member 65 which constitutes a fly-wheel. Shaft 37 is turnably mounted in casing 4 in a ball-bearing 5. An intermediate shaft 39, coaxial with shaft 37 and driven shaft 1, is mounted in a ball-bearing 40 in the drum 65, and in a ball-bearing 38 in an internal gear means 41 which is fixed on shaft 1. The pins 28 are fixedly secured to the drum 65 and turnably support the supporting arms 27 at whose ends the shafts 24 are mounted in ball-bearings 26. An arm 27 is arranged between the groups of friction disc means 25 so that only small bending stresses are exerted on the shafts 24.

As in the previously described embodiment, three shafts 24 are provided, but it will be understood that two shafts 24 or even one shaft 24 may be provided. However, a symmetrical arrangement including a plurality of shafts 24 is preferred.

Figure 8:
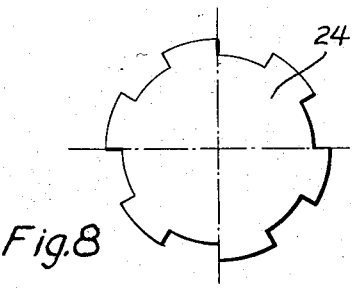
Fig. 8 is a cross-sectional view of a shaft.

The shafts 24 are provided with ridges and grooves as shown in Fig. 8. Two groups of friction disc means are mounted on each shaft 24 non-rotatable and slidable in axial direction by means of bores having a cross-section corresponding to the cross-section of the shafts 24. The central bores have convex arcuate surfaces 25 as shown in Fig. 7 and are mounted on the respective shafts 24 with sufficient play to permit sliding in axial direction without binding and to assume an oblique position when the thin peripheral portions of the discs 25 are engaged by the rims of the discs 21. As in the previous described embodiment, the arrangement may be reversed, and the friction discs on the shafts 24 provided with friction rims. In any event, all friction discs mounted on shafts 24 must belong to the same type, and all friction wheels mounted on the body 12 must belong to the other type.

The friction wheel means 21 are annular and mounted on an annular body means 12 which has a circular projecting portion 23 against which the meshing friction discs 21 and 25 are pressed by the pressure members 20. Friction wheels 21 are axially movable on ridges on the cylindrical surfaces 22. Each pressure member 20 is fixedly connected to a movable sleeve-shaped wedge means 9 provided with claws having helical wedge faces and cooperating with corresponding claws on sleeve-shaped wedge members 6 which are mounted on shaft 39 and are prevented from rotation by keys 6a. The sleeve-shaped wedge means 6 abut against a flange 1a and against a hub portion of the drum member 65 so that they cannot slide outwardly in axial direction. Springs 30 are arranged between the wedge means 6 and 9, respectively, and urge the pressure member inwardly to produce a frictional engagement between the friction disc means 25 and the friction wheel means 21 to prevent slipping of the friction discs when only a small torque is transmitted. When the torque exerted by shaft 37 is increased, the wedge means 6 and 9 urge the pressure members inwardly in axial direction to produce a frictional engagement between the discs 21 and 25 corresponding to the transmitted torque. The annular body means 12 is turnably mounted on the shaft 39 and has axial play, so that the pressure is evenly distributed between the two groups of meshing friction discs.

Figure 17:
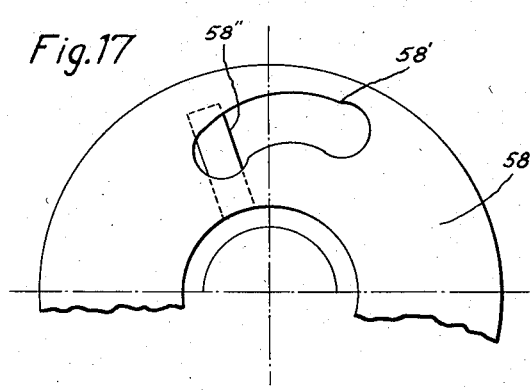
Fig. 17 is a fragmentary side view of a detail.

The shafts 24 carry gears 33 which are in continuous meshing engagement with gears 34 mounted on the pins 28 freely turnable on ball-bearings 35. Gears 50 are fixedly connected to gears 34 and mesh with an internal gear member 36 which is turnably mounted on a projection of the casing portion 47 on a ball-bearing 48. The outer surface of the internal gear 36 is embraced by a flexible brake means 49 which permits rotation of member 36 only in one direction of rotation. A member 58 of U-shaped cross-section consists of two annular disc portions 58a, 58b connected by a transverse annular portion. In disc portion 58b radial slots 58″ receiving the slide pins 60 on arms 29 are provided, and in the other disc portion 58a cam slots 58' for controlling the operation of the drive are provided, see Figs. 13, 14, 17. Pins having rollers 55 are connected to the members 57 and project into the cam slots 58' in the member 58. Member 58 is mounted in a roller bearing 59 in an annular member 51 which supports the ends of pins 28. Member 51 has U-shaped cross-section and is fixedly connected to the drum member 65. Member 51 is provided with radially extending slots which form together with the annular member 56 guide means for the members 57. Friction shoes 52 constituting centrifugal weights are secured to each member 57 and engage the inner surface of internal gear member 36 when moving in outward direction due to the action of the centrifugal force. A pin 54 is secured to each member 57 and is connected to one end of a spring means 53 whose other end is connected to a hub portion of member 36.

The supporting arms 27 carry centrifugal weights 66 which produce during rotation a centrifugal force exceeding the centrifugal force produced by the friction disc means 25 so that a centrifugal force results which urges the friction disc means 25 inwardly in radial direction toward the central shaft 39. This force increases with the rotary speed of the drive motor.

The friction drive operates in the following manner:

When the drum 65 and the supporting means 27 rotate in clockwise direction at idle speed, the spring means 53 overcome the action of centrifugal force and urge the shaft 24 and the friction disc means outwardly which corresponds to a maximum effective radius. When the rotary speed is increased, for instance by accelerating a motor driving shaft 37, the centrifugal force acting on the weights 66 urges the shaft 24 and the friction disc means 25 inwardly so that the friction discs 25 are deeper inserted between the friction wheel means 21 so that the effective radius is reduced. The driven shaft, and the vehicle is accelerated, starting with a transmission ratio of 1:∞. When the rotary speed of the drive shaft is increased, the friction disc means 25 move inwardly the effective radius is reduced, and the transmission ratio approaches the value of 1:1.

When the transmission ratio 1:1 is approached within a range of 15% to 20%, and the rotary speed of the motor further increased, the friction discs 25 reach a position in which the arms 29 turn member 58 through the slide pins 60, so that the rollers 55 of members 57 are forced by the action of the centrifugal force into the deepest recessed portions of the curved cam slots 58' in member 58.

When the rollers 55 pass beyond the edges of the recessed portion of the cam tracks 58', the centrifugal force acting on the friction shoes 52 exerts an additional turning moment on member 58 by which all supporting arms 27 are turned so that all friction discs 25 move further inwardly into a position in which the minimum radius is effected. At the same time the friction shoes 52 engage the inner surface of the member 36 and couple the internal gear 36 with the rotating parts of the transmission and with the drum member 65. In this position the transmission is in direct drive and all parts rotate at the same speed. Since the centrifugal force acting on the friction shoes 52 increases with the rotary speed of the drive motor, the internal gear 36 is coupled with the drum 65 with a force which corresponds to the rotary speed of the motor at the moment of coupling.

When the rotary speed is reduced, the centrifugal force decreases, and the forces exerted by the springs 53 exceed the centrifugal forces so that the rollers 55 of members 57 are pressed against the curved edge of the cam slots. Thereby the member 58 is subjected to a turning moment acting in a direction opposite to the previously acting turning moment.

When the vehicle continues to drive in direct drive with members 56 and 36 coupled, and the rotary speed falls below the rotary speed at which the members were coupled, the rollers 55 are lifted out of the recessed portions of the cam slots 58' and consequently pull the members 57 inwardly so that the friction shoes 52 release the inner surface of the internal gear member 36. Thereby the coupling connection between the parts rotating with members 65 and the internal gear members 36 is released and the direct coupling terminated.

The spring means 53 and the centrifugal weight 66 are exchangeable for adapting the apparatus to variable operation and conditions. Preferably, the spring means 53 are pretensioned so that the speed range of the control mechanism, and its response to changing operational conditions can be adjusted.

The forces exerted by the spring means 53 and by the centrifugal force through the cam slots to the member 58 is transmitted simultaneously and uniformly through the arms 29 to the supporting arms 27 and thereby all friction disc means 25.

During turning of the member 58, the slide pins 60 of the arms 29 slide in the radial slots in the disc portion 58b of the member 58.

When the member 58 is turned, the supporting arms 27 are pivoted so that the outer shafts 24 move toward or away from the central shaft 39. Thereby the groups of friction disc means 25 are moved between positions projecting between the friction wheel means 21 to different degrees. The effective radius of the transmission and thereby the ratio of the transmission is consequently depending on the adjustment of the member 58.

Since the peripheral portions of the friction disc means 25 are thinner than the inner portions of the same due to the conical shape of friction discs 25, the friction wheel means 21, and also the friction disc means 25, have to move apart in axial direction when the friction disc means 25 are deeper inserted between the friction wheel means 21 as the effective radius is reduced. Due to the fact that the friction disc means and friction wheel means are mounted in such manner as to easily slide in axial direction, the required position of the friction disc means and friction wheel means is reliably obtained.

The rotation of the drum 65 is transmitted to shaft 39 through the friction disc means 25, the friction wheel means 21 and through the sleeve-shaped wedge means 6 which are fixedly mounted on the shaft 39.

In the embodiment shown in Fig. 9, reversing means is provided which is arranged in a housing 2. The casing 47 extends to the shaft 39 and is provided with a projecting portion having a toothed crown 62.

A gear 46 is fixedly secured to shaft 39. A coupling 45 is mounted turnably on shaft 39 and is provided with teeth 61 arranged opposite the toothed crown 62 so that the teeth 61 engage the teeth 62 when the coupling means 45 is shifted in axial direction by an arm 63 which is operated by an operating rod 64.

Three pins 44 form part of the coupling means 45. A gear 42 is turnably mounted on each pin 44 by means of a ball-bearing 43 and continuously meshes with the gear 46 and with the internal gear 41 which is fixedly connected to shaft 1 and mounted in housing 2 by means of a ball-bearing 3.

The coupling means 45 is provided with an annular groove 45' into which the arm 63 projects. The gear crown 61 fits into the teeth of the gear 46 and of the gear crown 62. When the coupling means 45 is shifted by the cooperating means 63, 64 into the position V (forward drive), the teeth 61 engage the teeth of the gear 46 which is fixed on the shaft 39. Thereby, gears 42 are blocked, and the coupling means 45 rigidly connected with the shaft 39. In this position the shafts 39 and 1 are connected for rotation.

When the operating means 63, 64 are shifted to the position R, the teeth of the gear crown 61 engage the teeth of the gear crown 62 on the housing 47, and thereby the coupling means 45 is blocked. In this position which corresponds to rearward drive, the gear 42 transmits the turning movement of the shaft 39 to the shaft 1, which rotates in the direction opposite the direction of rotation of the shaft 39.

The above described reversing means permit forward and rearward drive of the vehicle at a variable speed which is automatically regulated due to the shifting of the friction disc means 25 under the combined action of the centrifugal force and the retracting force of the spring means 53.

It will be understood that each of the elements described above, or two or more together, may also find a useful application in other types of friction drives differing from the types described above.

While the invention has been illustrated and described as embodied in an automatically regulated gradually variable friction drive employing conical friction discs and annular friction wheels having friction rims, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A friction drive comprising, in combination, shaft means having an axis of rotation; at least one annular body means mounted on said shaft means, said annular body means having an outwardly projecting annular portion and two annular outer surfaces, one outer annular surface on each side of said annular projecting portion; two groups of annular friction wheel means, each group of annular friction wheel means being mounted on one of said annular surfaces non-rotatable and slidable in axial direction; supporting means; at least two shafts mounted on said supporting means and having axes of rotation parallel to said axis of rotation; two groups of friction disc means mounted on each of said shafts non-rotatable and slidable in axial direction, and being in frictional engagement with said two groups of friction wheel means; a pair of pressure members, each of said pressure members being mounted at one end of said annular body means non-rotatable and movable in axial direction, each of said pressure members cooperating with one of said groups of annular friction wheel means and the group of friction disc means meshing with the same and pressing associated groups of friction wheel means and friction disc means against said annular projecting portion of said annular body means when moving toward the same; and means for urging said pressure members in axial direction toward said annular projecting portion.

2. A friction drive comprising, in combination, shaft means having an axis of rotation; at least one annular body means mounted on said shaft means, said annular body means having an outwardly projecting annular portion and two annular outer surfaces, one outer annular surface on each side of said annular projecting portion; two groups of annular friction wheel means, each group of annular friction wheel means being mounted on one of said annular surfaces non-rotatable and slidable in axial direction; supporting means; at least two shafts mounted on said supporting means and having axes of rotation parallel to said axis of rotation; two groups of friction disc means mounted on each of said shafts non-rotatable and slidable in axial direction, and being in frictional engagement with said two groups of friction wheel means; a pair of pressure members, each of said pressure members being mounted at one end of said annular body means non-rotatable and movable in axial direction, each of said pressure members cooperating with one of said groups of annular friction wheel means and the group of friction disc means meshing with the same and pressing associated groups of friction wheel means and friction disc means against said annular projecting portion of said annular body means when moving toward the same; a pair of first wedge means fixedly connected to said shaft means; and a pair of second wedge means, each second wedge means secured to one of said pressure members and cooperating with one of said first wedge means so that during rotation of said shaft means said pressure members are urged toward said annular projecting portions with a pressure depending on the torque exerted by said shaft means and said first wedge means on said second wedge means.

3. A friction drive as claimed in claim 2 wherein said supporting means include at least one movable support for each of said shafts; and operating means for moving said movable supports in radial direction with respect to the axis of said shaft means whereby the effective radius between cooperating groups of annular friction wheel means and friction disc means is varied for varying the ratio of transmission of the friction drive.

4. A gradually variable friction drive comprising, in combination, shaft means having an axis of rotation; at least one annular body means mounted on said shaft means, said annular body means having an outwardly projecting annular portion and two annular outer surfaces, one outer annular surface on each side of said annular projecting portion; two groups of annular friction wheel means, each group of annular friction wheel means being mounted on one of said annular surfaces non-rotatable and slidable in axial direction; at least two shafts having axes of rotation parallel to said axis of rotation; two groups of friction disc means mounted on each of said shafts non-rotatable and slidable in axial direction, and being in frictional engagement with said two groups of friction wheel means; at least two movable supports, each of said supports supporting one of said shafts for movement in radial direction with respect to said axis of rotation of said shaft means for changing the effective radius between cooperating groups of annular friction wheel means and friction disc means, each of said supports including a bearing arm supporting the associated shaft intermediate said groups of friction disc means, and a pair of bearing arms supporting the associated shaft outwardly of said groups of friction disc means; a pair of pressure members, each of said pressure members being mounted at one end of said annular body means non-rotatable and movable in axial direction, each of said pressure members cooperating with one of said groups of annular friction wheel means and the group of friction disc means meshing with the same and pressing associated groups of friction wheel means and friction disc means against said annular projecting portion of said annular body means when moving toward the same; and means for urging said pressure members in axial direction toward said annular projecting portion.

5. A gradually variable friction drive comprising, in combination, shaft means having an axis of rotation; at least one annular body means mounted on said shaft means, said annular body means having an outwardly projecting annular portion and two annular outer surfaces, one outer annular surface on each side of said annular projecting portion; two groups of annular friction wheel means, each group of annular friction wheel means being mounted on one of said annular surfaces non-rotatable and slidable in axial direction; at least two shafts having axes of rotation parallel to said axis of rotation; two groups of friction disc means mounted on each of said shafts non-rotatable and slidable in axial direction, and being in frictional engagement with said two groups of friction wheel means; at least two movable supports, each of said supports supporting one of said shafts for movement in radial direction with respect to said axis of rotation of said shaft means for changing the effective radius between cooperating groups of annular friction wheel means and friction disc means, each of said supports including a bearing arm supporting the associated shaft intermediate said groups of friction disc means, and a pair of bearing arms supporting the associated shaft outwardly of said groups of friction disc means; a pair of pressure members, each of said pressure members being mounted at one end of said annular body means non-rotatable and movable in axial direction, each of said pressure members cooperating with one of said groups of annular friction wheel means and the group of friction disc means meshing with the same and pressing associated groups of friction wheel means and friction disc means against said annular projecting portion of said annular body means when moving toward the same; a pair of first wedge means fixedly connected to said shaft means; and a pair of second wedge means, each second wedge means secured to one of said pressure members and cooperating with one of said first wedge means so that during rotation of said shaft means said pressure members are urged toward said annular projecting portions with a pressure depending on the torque exerted by said shaft means and said first wedge means on said second wedge means.

6. A gradually variable friction drive comprising, in combination, shaft means having an axis of rotation; at least one annular body means mounted on said shaft means, said annular body means having an outwardly projecting annular portion and two annular outer surfaces, one outer annular surface on each side of said annular projecting portion; two groups of annular friction wheel means, each group of annular friction wheel means being mounted on one of said annular surfaces non-rotatable and slidable in axial direction; at least two shafts having axes of rotation parallel to said axis of rotation; two groups of friction disc means mounted on each of said shafts non-rotatable and slidable in axial direction, and being in frictional engagement with said two groups of friction wheel means; at least two movable supports, each of said supports supporting one of said shafts for movement in radial direction with respect to said axis of rotation of said shaft means for changing the effective radius between cooperating groups of annular friction wheel means and friction disc means, each of said supports including a bearing arm supporting the associated shaft intermediate said groups of friction disc means, and a pair of bearing arms supporting the associated shaft outwardly of said groups of friction disc means; a pair of pressure members, each of said pressure members being mounted at one end of said annular body means non-rotatable and movable in axial direction, each of said pressure members cooperating with one of said groups of annular friction wheel means and the group of friction disc means meshing with the same and pressing associated groups of friction wheel means and friction disc means against said annular projecting portion of said annular body means when moving toward the same; a pair of first wedge means fixedly connected to said shaft means; a pair of second wedge means, each second wedge means secured to one of said pressure members and cooperating with one of said first wedge means so that during rotation of said shaft means said pressure members are urged toward said annular projecting portions with a pressure depending on the torque exerted by said shaft means and said first wedge means on said second wedge means; and spring means urging each of said pressure members toward said annular projecting portion of said annular body means and producing frictional engagement between said friction wheel means and said friction disc means independently of the transmitted torque.

7. A friction drive as claimed in claim 6 wherein said friction wheel means and said friction disc means are formed with central bores having arcuate convex surfaces so as to prevent binding during axial sliding in a slightly oblique position.

8. A friction drive comprising, in combination, shaft means having an axis of rotation; at least one annular body means mounted on said shaft means and having a cylindrical outer surface having a diameter substantially greater than the diameter of said shaft means; means connecting said annular body means to said shaft means for rotation therewith; two groups of annular friction wheel means non-rotatably mounted on said outer surface of said annular body means and having annular friction rim means; supporting means; at least two shafts mounted on said supporting means and having axes of rotation parallel to said axis of rotation; and at least two groups of friction disc means mounted on each of said shafts having conical friction faces and being in frictional meshing engagement with said two groups of friction wheel means and annular pressure plate members mounted on said outer surface of said annular body means for pressing said two groups of annular friction wheel means into frictional engagement with said groups of friction disc means.

9. A friction drive comprising, in combination, a shaft means having an axis of rotation; at least one pair of annular body means mounted on said shaft means, each of said annular body means having an outwardly projecting annular portion and two outer annular surfaces, one outer annular surface on each side of said annular projecting portion; two groups of annular friction wheel means mounted on said annular surfaces of each of said annular body means non-rotatable and slidable in axial direction; at least two shafts extending parallel to said shaft means; at least four groups of friction disc means mounted on each of said shafts non-rotatable and slidable in axial direction, said groups of friction disc means being in frictional engagement with said groups of friction wheel means; two pairs of pressure members, the pressure members of each pair of pressure members being mounted on said annular surfaces of one of said body means non-rotatable and movable in axial direction toward and away from the respective annular projecting portion, each of said pressure members cooperating with one of said groups of annular friction wheel means and the group of friction discs means meshing with the same and pressing associated groups of friction wheel means and friction disc means against said annular projecting portion of the associated annular body means when moving toward the same; and means for urging said pressure members of each of said pairs of pressure members toward each other and toward said projecting annular portion of the annular body means associated therewith.

10. A friction drive comprising, in combination, a shaft means having an axis of rotation; at least one pair of annular body means mounted on said shaft means, each of said annular body means having an outwardly projecting annular portion and two outer annular surfaces, one outer annular surface on each side of said annular projecting portion; two groups of annular friction wheel means mounted on said annular surfaces of each of said annular body means non-rotatable and slidable in axial direction; at least two shafts extending parallel to said shaft means; at least four groups of friction disc means mounted on each of said shafts non-rotatable and slidable in axial direction, said groups of friction disc means being in frictional engagement with said groups of friction wheel means; two pairs of pressure members, the pressure members of each pair of pressure members being mounted on said annular surfaces of one of said body means non-rotatable and movable in axial direction toward and away from the respective annular projection portion, each of said pressure members cooperating with one of said groups of annular friction wheel means and the group of friction discs means meshing with the same and pressing associated groups of friction wheel means and friction disc means against said annular projecting portion of the associated annular body means when moving toward the same; a central sleeve-shaped means mounted on said shaft means intermediate said annular body means and between two of said pressure members; two sleeve-shaped means secured to said shaft means on opposite ends of said pair of annular body means; and resilient means abutting against said sleeve-shaped means and against said pressure members and urging said pressure members toward said projecting annular portions.

11. A friction drive as claimed in claim 10 and including first wedge-shaped claw means secured to said sleeve-shaped means; and second wedge-shaped claw means secured to each of said pressure members and engaging said first wedge-shaped claw means so that during rotating of said shaft means said pressure members are urged in axial direction by wedge action of said wedge-shaped claw means to move toward the associated projecting annular portion whereby said groups of friction wheel means and friction disc means are urged into frictional engagement with a force corresponding to the torque transmitted by said shaft means.

12. A friction drive as claimed in claim 10, wherein said central sleeve-shaped means is mounted on said shaft means non-rotatable and slidable in axial direction.

13. A gradually variable friction drive comprising, in combination, shaft means having an axis of rotation; at least one annular body means mounted on said shaft means, said annular body means having an outwardly projecting annular portion and two annular outer surfaces, one outer annular surface on each side of said annular projecting portion; two groups of annular friction wheel means, each group of annular friction wheel means being mounted on one of said annular surfaces non-rotatable and slidable in axial direction; at least two shafts having axes of rotation parallel to said axis of rotation; two groups of friction disc means mounted on each of said shafts non-rotatable and slidable in axial direction, and being in frictional engagement with said two groups of friction wheel means; at least two movable supports, each of said supports supporting one of said shafts for movement in radial direction with respect to said axis of rotation of said shaft means for changing the effective radius between cooperating groups of annular friction wheel means and friction disc means; control means for automatically controlling the movement of said movable supports; a pair of pressure members, each of said pressure members being mounted at one end of said annular body means non-rotatable and movable in axial direction, each of said pressure members cooperating with one of said groups of annular friction wheel means.

14. A variable friction drive as claimed in claim 13 wherein said control means include centrifugal weights connected to said movable supports; and spring means connected to said movable supports for counteracting the action of said centrifugal weights.

15. A variable friction drive as claimed in claim 13 wherein said control means include an annular member formed with slots; pins secured to said movable supports and projecting into said slots for simultaneous operation of said movable supports; centrifugal weight means connected to said annular member for turning the same in accordance with the rotary speed of said shaft means; and spring means counteracting the centrifugal force of said centrifugal weight means and being connected to the same.

16. A variable friction drive as claimed in claim 13 wherein said movable supports are pivoted levers and including centrifugal weight means connected to said pivoted levers for turning the same into a position in which said shafts move toward said shaft means whereby said friction disc means project deeper between said friction wheel means for varying the effective transmission radius.

17. A friction drive comprising, in combination, first shaft means having an axis of rotation; at least one annular body means mounted on said shaft means; means connecting said annular body means to said shaft means for rotation therewith; two groups of annular friction wheel means non-rotatably mounted on said annular body means; supporting means; at least two shafts mounted on said supporting means and having axes of rotation parallel to the axis of rotation of said first shaft means; at least two groups of friction disc means mounted on each of said two shafts and in frictional meshing engagement with said two groups of friction wheel means, the elements of all of said groups being relatively axially movable along their respective shafts, the elements of certain of said groups having opposed coned faces; and means yieldingly urging the intermeshing wheel elements and disc elements axially toward each other.

18. A friction drive comprising, in combination, first shaft means having an axis of rotation; at least one annular body means mounted on said shaft means for rotation therewith; two groups of annular friction wheel means non-rotatably but axially-movably mounted on said annular body means; supporting means; at least two shafts mounted on said supporting means and having axes of rotation parallel to the axis of rotation of said first shaft means, angularly spaced from each other about the axis of said first shaft means and concurrently movable toward and away from the axis of said first shaft; at least two groups of friction disc means mounted on each of said two shafts and in frictional meshing engagement with said two groups of friction wheel means, the elements of certain of said groups having opposed coned faces; and means yieldingly urging the intermeshing wheel elements and disc elements axially toward each other.

References Cited in the file of this patent

UNITED STATES PATENTS

| 2,563,896 | Wildhaber | Aug. 14, 1951 |

FOREIGN PATENTS

| 392,917 | Great Britain | May 24, 1933 |
| 379,893 | Italy | Apr. 12, 1940 |